United States Patent
Bulatow et al.

(10) Patent No.: US 9,689,267 B2
(45) Date of Patent: Jun. 27, 2017

(54) BLADE WHEEL FOR A ROTARY ELECTRIC MACHINE AND ROTARY ELECTRIC MACHINE COMPRISING A BLADE WHEEL

(71) Applicant: Continental Automotive GmbH, Hannover (DE)

(72) Inventors: Michael Bulatow, Berlin (DE); Knut Welke, Falkensee (DE); Dirk Wesche, Muencheberg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 447 days.

(21) Appl. No.: 14/390,912

(22) PCT Filed: Apr. 9, 2013

(86) PCT No.: PCT/EP2013/057406
§ 371 (c)(1),
(2) Date: Oct. 6, 2014

(87) PCT Pub. No.: WO2013/153072
PCT Pub. Date: Oct. 17, 2013

(65) Prior Publication Data
US 2015/0054362 A1 Feb. 26, 2015

(30) Foreign Application Priority Data
Apr. 10, 2012 (DE) .................. 10 2012 205 758

(51) Int. Cl.
*F01D 5/18* (2006.01)
*H01R 39/48* (2006.01)
(Continued)

(52) U.S. Cl.
CPC ............... *F01D 5/18* (2013.01); *F01D 11/02* (2013.01); *H01R 39/48* (2013.01); *H02K 5/10* (2013.01);
(Continued)

(58) Field of Classification Search
CPC . F01D 5/18; F01D 11/02; F01D 5/147; H02K 5/141; H02K 13/003; H02K 9/28;
(Continued)

(56) References Cited

U.S. PATENT DOCUMENTS 2,747,512 A * 5/1956 Fouche ............... F04D 13/0646
310/67 R
4,642,036 A * 2/1987 Young ..................... F04D 13/06
415/90
(Continued)

FOREIGN PATENT DOCUMENTS

CN 1894841 A 1/2007 ............. H02K 49/04
DE 2035832 A1 1/1972 ............... H02K 9/26
(Continued)

OTHER PUBLICATIONS

STIC generated search report; Generated Feb. 10, 2017.*
(Continued)

*Primary Examiner* — Craig Kim
*Assistant Examiner* — Eldon Brockman
(74) *Attorney, Agent, or Firm* — Slayden Grubert Beard PLLC (57) ABSTRACT

A blade wheel for a rotary electric machine may include a hollow cylindrical main body having an outer surface extending around an axis of rotation in a circumferential direction of the main body; a first end region and a second end region of the main body, each peripherally extending around the main body in the circumferential direction, the first and second end regions lying opposite each other in the direction of the axis of rotation; a recess extending along the outer surface and between the first end region and the second end region of the main body in the circumferential direction; and at least one web-shaped vortexing element extending within the recess and between the first and second end
(Continued)

regions. The at least one vortexing element is designed to generate a movement of air away from the outer surface when the blade wheel rotates about the axis of rotation.

18 Claims, 4 Drawing Sheets

(51) Int. Cl.
```
H02K 5/10      (2006.01)
H02K 9/28      (2006.01)
H02K 13/00     (2006.01)
F01D 11/02     (2006.01)
H02K 5/14      (2006.01)
```
(52) U.S. Cl.
CPC .............. *H02K 5/141* (2013.01); *H02K 9/28* (2013.01); *H02K 13/003* (2013.01)

(58) Field of Classification Search
CPC .. H02K 5/10; H02K 1/32; H02K 5/20; H02K 9/197; H02K 9/005; H02K 3/48; H02K 9/22; H01R 39/48; F04D 25/0653; F04D 25/062; F04D 25/082; F04D 29/102; F04D 25/064; F04D 13/025; F04D 13/0613

See application file for complete search history.

(56) References Cited

U.S. PATENT DOCUMENTS

| | | | |
|---|---|---|---|
| 7,699,586 B2* | 4/2010 | LaRose | A61M 1/101 417/356 |
| 7,972,122 B2* | 7/2011 | LaRose | F04D 3/02 417/356 |
| 9,500,204 B2* | 11/2016 | Quix | F04D 7/045 |
| 2007/0231136 A1* | 10/2007 | Hsu | F04D 29/057 416/3 |
| 2007/0295568 A1 | 12/2007 | Vasilescu | 188/267 |
| 2011/0248599 A1 | 10/2011 | Schurig et al. | 310/227 |
| 2013/0294910 A1* | 11/2013 | Hansen | F04D 7/045 415/230 |

FOREIGN PATENT DOCUMENTS

| | | | | |
|---|---|---|---|---|
| DE | 2035835 A1 | 1/1972 | ............. | F01P 11/08 |
| DE | 2448522 A1 | 5/1975 | ............. | H02K 19/22 |
| DE | 8008971 U1 | 8/1981 | ............. | H02K 5/14 |
| DE | 10014310 A1 | 10/2001 | ............. | H02K 5/14 |
| DE | 102008041650 A1 | 3/2010 | ............. | H01R 39/48 |
| DE | 202012000841 U1 | 2/2012 | ............. | H02K 5/124 |
| GB | 1312546 A | 4/1973 | ............. | F01P 11/08 |
| JP | 2002153694 A | 5/2002 | ............. | D06F 37/40 |
| WO | 2013/153072 A2 | 10/2013 | ............. | H02K 5/14 |

OTHER PUBLICATIONS

International Search Report and Written Opinion, Application No. PCT/EP2013/057406, 20 pages, Mar. 26, 2014.

International Search Report and Written Opinion, Application No. PCT/EP2013/051225, 9 pages, Mar. 27, 2014.

Chinese Office Action, Application No. 201380019438.8, 13 pages, Dec. 16, 2015.

* cited by examiner

BLADE WHEEL FOR A ROTARY ELECTRIC MACHINE AND ROTARY ELECTRIC MACHINE COMPRISING A BLADE WHEEL

CROSS-REFERENCE TO RELATED APPLICATIONS

This application is a U.S. National Stage Application of International Application No. PCT/EP2013/057406 filed Apr. 9, 2013, which designates the United States of America, and claims priority to DE Application No. 10 2012 205 758.7 filed Apr. 10, 2012, the contents of which are hereby incorporated by reference in their entirety.

TECHNICAL FIELD

The present invention relates to an impeller wheel for a rotating electric machine and to a rotating electric machine in particular an electric motor or a generator having an impeller wheel. The present invention relates moreover to a motor vehicle having a rotating electric machine of this type.

BACKGROUND

Electric motors are being installed ever more frequently in modern motor vehicles. Electric motors are installed in particular as drive motors that are fully integrated into the drive train or they are installed in hybrid applications by way of example as starter generators. Separately excited synchronous machines that comprise a rotor composed of a lamination stack that is provided with an exciter winding are sometimes used. The ends of the exciter winding are guided over two slip rings that are arranged on the rotor shaft. The exciter voltage is applied to the exciter winding by way of carbon brushes. The two slip rings together with the base body that is supporting said slip rings are frequently also referred to simply as "slip ring".

Rotating electric machines of this type are encumbered with the problem that abraded particles of the carbon brushes penetrate in the form of electrically conductive dust particles into the inside of the machine. These dust particles can deposit themselves by way of example as a conductive layer on the machine elements and can cause electrically conductive leakage paths.

The document DE 100 14 310 A1 discloses an electric machine having a floating gap seal for the purpose of sealing the housing inner space of the electric machine. Although a gap seal of this type can hinder the penetration of dust into the housing inner space, it is still necessary to protect the housing inner space in an improved manner against the penetration of brush dust.

The document DE 10 2008 041 650 A1 describes an electric machine having a fan that comprises protruding fan blades for the purpose of distributing the air, as a consequence of which abraded brush dust is carried away from the slip rings together with the air.

SUMMARY

One embodiment provides an impeller wheel for a rotating electric machine that comprises the following features: a hollow cylindrical base body having an outer peripheral surface, wherein the impeller wheel comprises an axis of rotation about which the peripheral surface extends in the circumferential direction of the base body; a first end region that encircles the base body in the circumferential direction of said base body, and a second end region that encircles the base body in the circumferential direction of said base body, wherein the first end region and the second end region lie opposite one another in the direction of the axis of rotation; a groove in the peripheral surface, wherein the groove extends in the circumferential direction of the base body along the peripheral surface and between the first end region and the second end region of the base body; and at least one web-shaped impeller element that extends in the groove between the first end region and the second end region, as a consequence of which the at least one impeller element is designed so as to generate an air movement as the impeller wheel rotates about the axis of rotation and said air movement flows away from the peripheral surface.

In a further embodiment, the at least one impeller element interrupts the groove at least in part in the circumferential direction of the base body.

In a further embodiment, the at least one impeller element extends from the first end region as far as the second end region, as a consequence of which the at least one impeller element completely interrupts the groove in the circumferential direction of the base body.

In a further embodiment, the at least one impeller element extends in parallel with the axis of rotation.

In a further embodiment, the at least one impeller element extends in an inclined manner with respect to the axis of rotation.

In a further embodiment, the at least one impeller element extends in the form of a helix.

In a further embodiment, the at least one impeller element comprises a surface on a face that is remote from the axis of rotation, wherein this surface is embodied with respect to the peripheral surface not protruding, in particular in an essentially planar manner with respect to the peripheral surface.

Another embodiment provides a rotating electric machine that comprises the following features: a rotor shaft and an impeller wheel as discussed above, wherein the impeller wheel is arranged on the rotor shaft and is connected to the rotor shaft in a non-rotatable manner.

In a further embodiment, the rotating electric machine also comprises the following features: a housing part that encompasses at least in part a housing inner space of the electric machine, wherein the housing inner space is designed so as to receive the rotor shaft, an opening on the housing part, through which the rotor shaft is guided in part out of the housing inner space, a slip ring that is arranged outside the housing inner space and on the rotor shaft, wherein the impeller wheel is arranged between the housing inner space and the slip ring and outside the housing inner space, as a consequence of which the impeller wheel is designed so as to generate the air movement for the purpose of carrying away dust from the opening and/or from the slip ring.

In a further embodiment, the impeller wheel is embodied in such a manner that it can be plugged onto the rotor shaft.

In a further embodiment, at least one labyrinth seal is provided between the housing inner space and the slip ring and said labyrinth seal comprises on the rotor shaft a first form element that encircles the rotor shaft, and a second form element on the housing part that meshes with the first form element and encircles the rotor shaft.

In a further embodiment, the impeller wheel and the first form element are embodied as one piece.

In a further embodiment, the electric machine comprises in the opening and between the impeller wheel and the housing inner space a funnel-shaped flow-guiding element that encircles the rotor shaft and is embodied in such a manner that the air movement that is generated by the impeller wheel is diverted in a direction that leads away from the housing inner space.

In a further embodiment, the flow-guiding element is embodied as one piece with the housing part.

Another embodiment provides a motor vehicle having a rotating electric machine as disclosed above.

BRIEF DESCRIPTION OF THE DRAWINGS

Example embodiments of the invention are discussed below in more detail with reference to the drawings, in which.

DETAILED DESCRIPTION

Embodiments of the invention provide a possibility wherein any brush dust that has occurred during the operation of an electrical machine is to the greatest possible extent prevented in a technically simple and simultaneously particularly effective manner from penetrating the machine interior.

Some embodiments provide an impeller wheel is proposed for a rotating electric machine, said impeller wheel having the following features:
- a hollow cylindrical base body having an outer peripheral surface, wherein the impeller wheel comprises an axis of rotation about which the peripheral surface extends in the circumferential direction of the base body,
- a first end region that encircles the base body in the circumferential direction of said base body, and a second end region that encircles the base body in the circumferential direction of said base body, wherein the first and the second end region lie opposite one another in the direction of the axis of rotation,
- a groove in the peripheral surface, wherein the groove extends in the circumferential direction of the base body along the peripheral surface and between the first and the second end region of the base body, and
- at least one web-shaped impeller element that extends in the groove between the first and the second end region, as a consequence of which the at least one impeller element is embodied in such a manner that an air movement is generated as the impeller wheel rotates about the axis of rotation and said air movement flows away from the peripheral surface.

The term an 'impeller wheel' is understood to mean here and here in under a device that can rotate about its axis of rotation, said device comprising impeller elements that generate an air movement as the impeller wheel rotates about the axis of rotation.

The term 'peripheral direction' of the hollow cylindrical base body is understood to mean the direction which encircles the base body on its circumference along the outer peripheral surface of the base body.

The impeller wheel may comprise at least two impeller elements that are arranged uniformly distributed at identical intervals in relation to one another in the groove. The uniform distribution of the impeller elements in the groove avoids any imbalance of the impeller wheel.

By means of providing the groove in the outer peripheral surface and between the two opposite lying end regions of the hollow cylindrical base body of the impeller wheel and by means of embodying the at least one web-shaped impeller element that extends in the groove between the first and the second end region, it is rendered possible to form a trough-shaped recess in the peripheral surface of the base body of the impeller wheel, said recess together with the impeller element and the two end regions of the base body act as a turbine blade of a turbine, and as the said impeller wheel rotates about its axis of rotation generates an air movement that flows away from the peripheral surface.

If brush dust particles pass into the region of the trough-shaped recess, said particles are carried away from the peripheral surface and consequently from the impeller wheel by means of the air movement, As a consequence, the brush dust particles that occur during the operation of an electrical machine are prevented in a technically simple and simultaneously particularly effective manner from passing into the machine interior.

In one embodiment, the at least one impeller element is embodied in such a manner that it interrupts at least in part the groove in the circumferential direction of the base body. In other words: the at least one impeller element does not extend continuously from the first end region to the second end region. This embodiment provides the advantage that by virtue of the interruption at the impeller element an air movement is formed that has different magnitudes of turbulence. As a consequence, the rate of the air movement changes which is advantageous when carrying away dust particles that comprise different sizes.

In an alternative embodiment, the at least one impeller element extends from the first end region as far as the second end region, as a consequence of which the at least one impeller element completely interrupts the groove in the circumferential direction of the base body. This embodiment provides the advantage that as a consequence when the rate of rotation of the impeller wheel is itself constant, an air movement is generated that to a great extent is constant but is comparatively more forceful.

In a further embodiment, the at least one impeller element extends in parallel with the axis of rotation.

In an alternative embodiment, the at least one impeller element extends in an inclined manner with respect to the axis of rotation.

It is preferred that the at least one impeller element extends in the circumferential direction of the base body of the impeller wheel in the shape of a helix or rather in the shape of a spiral.

The three latter mentioned embodiments produce different magnitudes of turbulence in the air movement, said air movement being generated by the impeller wheel during rotation.

In a further embodiment, the at least one impeller element comprises a surface on one face that is remote from the axis of rotation, wherein this surface is embodied with respect to the peripheral surface not protruding, in particular in an essentially planar manner with respect to the peripheral surface.

The impeller element surface that does not protrude with respect to the peripheral surface and is embodied in an essentially planar manner with respect to the peripheral surface provides the advantage that it is possible to produce the impeller wheel in a cost effective manner as a mass-produced product by way of example using an injection molding method that has few production steps. In addition, an impeller element that is embodied in this manner generates an air movement that has magnitudes of turbulence that effectively carry away the dust particles that are located in the region of the impeller element.

Alternatively, the at least one impeller element when viewed in a radial manner commencing from the axis of rotation of the impeller wheel can comprise a height that is less than the heights of the two end regions. It is also feasible that the two end regions comprise in each case a height that is different from one another.

Other embodiments provide a rotating electric machine that comprises a rotor shaft and an impeller wheel that is described above, wherein the impeller wheel is arranged on the rotor shaft and is connected to the rotor shaft in non-rotatable manner.

Rotating electric machines are suitable for use in a motor vehicle. They can be used both as drive motors that are fully integrated in the drive train, by way of example as wheel hub motors or axle motors and also by way of example as starter generators. The electric machine can be embodied as an electric motor or as a generator or can be operated both as an electric motor and also as a generator.

In the case of an electric machine of this type, any occurring brush dust can be prevented from penetrating the machine interior by virtue of the fact that the dust is carried away by the air movement that is generated by the impeller wheel. The impeller wheel is embodied and arranged in the manner described above for the purpose that before dust particles that occur on the brushes of the electric machine can penetrate the housing inner space said dust particles are carried away in the essentially radial direction from the rotor shaft by virtue of the air movement that is generated during operation.

In one embodiment, the rotating electric machine comprises moreover a housing part that encompasses at least in part a housing inner space of the electric machine. The housing inner space is designed so as to receive for the most part the rotor shaft. The electric machine comprises on the housing part an opening through which the rotor shaft is guided in part out of the housing inner space. The electric machine comprises outside the housing inner space a slip ring that is arranged on the rotor shaft. The above described impeller wheel is arranged between the housing inner space and the slip ring and outside the housing inner space. The impeller wheel is designed so as during rotation of the rotor shaft during operation of the electric machine to generate the above mentioned air movement in order to carry away brush dust from the opening.

In a further embodiment of the electric machine, the impeller wheel is embodied in such a manner that said impeller wheel can be plugged onto the rotor shaft. In the case of this embodiment, the impeller wheel can be plugged on to the rotor shaft in a simple manner during the assembly process so that additional assembly expense is not necessary. The impeller wheel can then be removed from the rotor shaft in a simple manner as required, such as for example when repairing the electric machine.

In a further embodiment, the electric machine comprises at least one labyrinth seal between the housing inner space and the slip ring. The labyrinth seal comprises a first form element that is embodied in such a manner that it encircles the rotor shaft and is arranged on the rotor shaft, and a second form element that meshes with the first form element and is likewise embodied in such a manner that it encircles the rotor shaft and is arranged on the housing part. It is preferred that the first and the second form element comprise in each case a surface of an electrically insulating material, by way of example a synthetic material. The form elements can also be embodied entirely from synthetic material.

The term 'labyrinth seal' is understood to mean here and here in under a non-contact seal whose sealing effect relates to the considerable lengthening of the path through the labyrinth. The lengthening of the path can be achieved by virtue of the form elements meshing with one another on the rotor shaft and on a fixed housing part. The labyrinth seal is arranged in a concentric manner about the rotor shaft. The labyrinth seal can be embodied in particular as a multi-groove labyrinth seal and comprise several sealing elements that are connected in series one behind the other and are composed of form elements that mesh one with the other.

In the case of a rotating electric machine of this type, it is possible to prevent any occurring brush dust from penetrating the machine inner space, in other words the housing inner space, by virtue of the fact that on the one hand the path traveled by the dust as far as into the housing inner space is considerably lengthened by virtue of the labyrinth seal and on the other hand the windings of the labyrinth seal prevent the dust from penetrating unhindered into the housing inner space. The provision of a labyrinth seal thus increases in addition the sealing effect and consequently enhances the effect of the impeller wheel in an advantageous manner.

In one embodiment, the impeller wheel is connected upstream of the labyrinth seal on the slip-ring side. In the case of this embodiment, a dust flow coming from the slip rings thus passes initially into the sphere of action of the impeller wheel that removes a great proportion of the dust particles from the critical region. Thus, only a greatly thinned-out dust flow still impinges on the labyrinth seal.

In a further embodiment of the electric machine, the impeller wheel and the first form element are embodied as one piece. The impeller wheel and the first form element can be produced as a mass-produced product as a one-piece cast component in a simple manner using an injection molding method.

In a further embodiment, the electric machine comprises a funnel-shaped flow-guiding element in the opening and between the impeller wheel and the housing inner space, said flow-guiding element being embodied in such a manner as to encircle the rotor shaft in the circumferential direction of said rotor shaft and said flow-guiding element being designed in such a manner that the air movement that is generated by the impeller wheel is diverted in a direction that leads away from the housing inner space.

The flow-guiding element may be embodied as one piece with the housing part.

Other embodiments provide a motor vehicle that comprises an electric machine described above. The motor vehicle can be embodied as an electric vehicle or a hybrid vehicle, wherein the electric machine is used as the drive of the motor vehicle.

Figure 1:
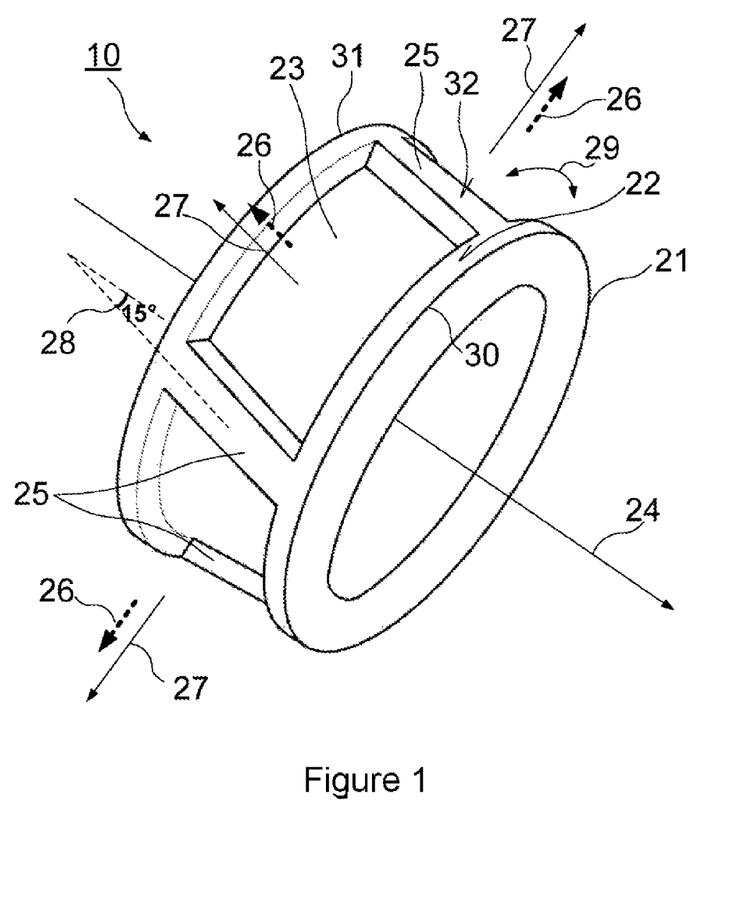
FIG. 1 illustrates a schematic perspective view of an impeller wheel of one embodiment.
Figure 2:
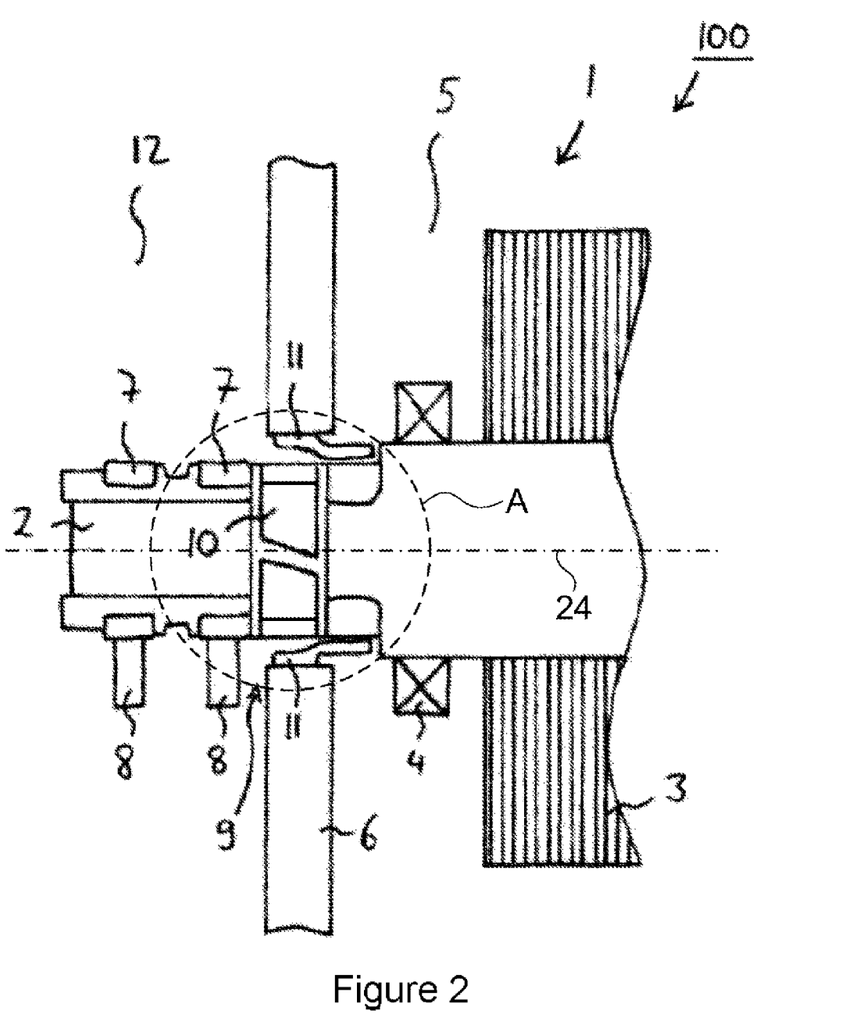
FIGS. 2 and 2A illustrate a schematic cross-sectional view of a section of a rotating electric machine in accordance with one embodiment.
Figure 2A:
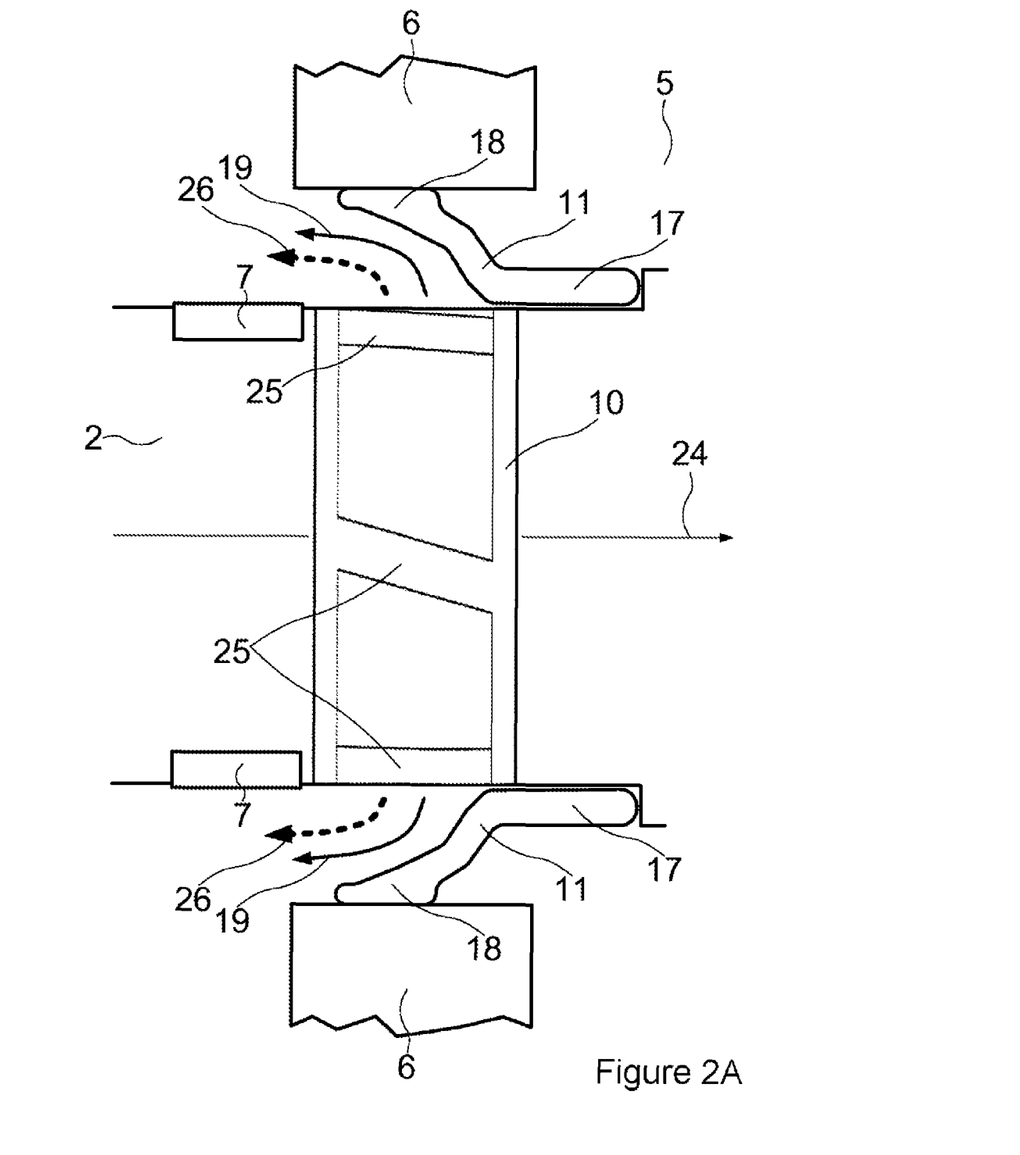
Figure 3:
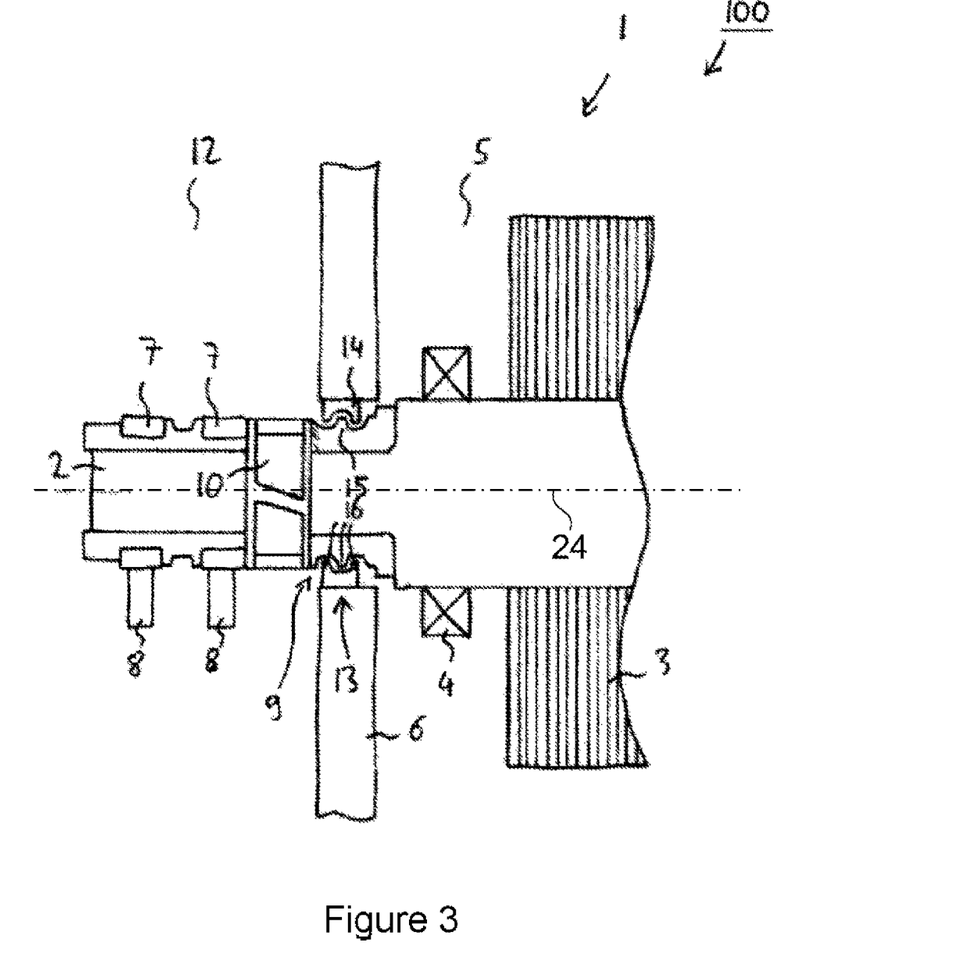
FIG. 3 illustrates a schematic cross-sectional view of a section of a rotating electric machine in accordance with a further embodiment.

FIG. 1 illustrates in a schematic perspective view an impeller wheel 10 for a rotating electric machine 100 that is illustrated in FIGS. 2, 2A and 3 and is to be described hereinunder.

The impeller wheel 10 comprises a hollow cylindrical base body 21, a cylindrical peripheral surface 22 that encircles the base body 21 in the circumferential direction 29 of said base body and encompasses the periphery of said base body. The impeller wheel 10 is embodied in such a manner that it can rotate about an axis of rotation 24, wherein the axis of rotation 24 extends in parallel with the peripheral surface 22 and extends through the center circle of the base body 21.

Moreover, the impeller wheel 10 comprises a further end region 30 that encircles the base body 21 in the circumferential direction 29 of said base body, and a second end region 31 that likewise encircles the base body 21 in the circumferential direction 29 of said base body. The first end region 30 and the second end region 31 lie opposite one another when viewed in the direction of the axis of rotation 24.

The impeller wheel 10 comprises a groove 23 that encircles the base body 21 in the circumferential direction 29 of said base body and that extends along the peripheral surface 22 and between the first and the second end region 30, 31 of the base body 21.

A number of at least three web-shaped impeller elements 25 is provided in this groove 23 and said impeller elements are arranged uniformly distributed at identical intervals in relation to one another in the groove 23. Trough-shaped recesses that comprise a lozenge-shaped surface are formed between the impeller elements 25. The impeller elements 25 extend in each case in an inclined manner at an angle 28 of approx. 15° with respect to the axis of rotation 24. By virtue of the inclined arrangement of the impeller elements 25 with respect to the axis of rotation 24, said impeller elements generate air movements 26 as the impeller wheel 10 rotates about the axis of rotation 24 and said air movements flow away from the peripheral surface 22 and in the direction 27 perpendicular to the axis of rotation 24.

The impeller elements 25 comprise in each case a surface 32 on one face that is remote from the axis of rotation 24, wherein these surfaces 32 and the peripheral surface 22 are embodied in a planar manner with respect to one another.

FIGS. 2, 2A illustrate in a cross-sectional view perpendicular to a rotor shaft 2 of the electric machine 100 a section of an electric machine 100 that is embodied as a separately-excited synchronous machine, wherein FIG. 2A in turn illustrates a section A of the electric machine 100 that is illustrated in FIG. 2. The stator of the electric machine 100 is not illustrated. The rotor 1 comprises a rotor lamination stack 3 that is arranged on the rotor shaft 2.

The rotor lamination stack 3 is arranged in a housing inner space 5. The rotor shaft 2 is mounted in a rotatable manner in the housing inner space 5, wherein only one bearing 4 is illustrated. The rotor shaft 2 is guided in part through an opening 9 in a housing part 6, by way of example a bearing plate, out of the housing inner space 5.

Outside the housing inner space 5, two slip rings 7 are arranged on the rotor shaft 2 and by way of said slip rings the exciter voltage is applied by means of carbon brushes 8 to the exciter windings, not illustrated, of the rotor 1.

A slip ring capsule, not illustrated, can encompass the slip rings 7 and the carbon brushes 8 and thus a brush chamber 12.

During the operation of the rotor 1, electrically conductive carbon dust from the carbon brushes 8 is generated in the brush chamber 12. It is possible by way of example for the carbon dust to pass through the opening 9 into the housing inner space 5, for the carbon dust to deposit itself there as an electrically conductive layer and for this to lead to leakage flows.

In order to prevent this, the rotor 1 comprises in the region of the opening 9 on the rotor shaft 2 an impeller wheel 10 that is described above. The impeller wheel 10 is connected in a non-rotatable manner to the rotor shaft 2 and said impeller wheel rotates during the operation of the electric machine 100 with the rotor shaft 2 about a rotor axis that is simultaneously the axis of rotation 24 of the impeller wheel 10. The impeller wheel 10 generates the air movement 26 that is illustrated in FIG. 1 and carries away the carbon dust particles from the opening 9.

A flow-guiding element 11 that is embodied as one piece with the housing part 6 is provided in the opening 9 and said flow-guiding element supports the effect of the impeller wheel 10. Thus, as illustrated in detail in FIG. 2A, the flow-guiding element 11 is in the shape of a funnel and comprises at one end that is facing the housing inner space 5 a smaller diameter than that of the end 18 that is remote from a housing inner space 5 and consequently facing the slip rings 7.

During the operation of the electric machine 100, the flow-guiding element 11 guides the air movement 26 that is generated by the impeller wheel 10 in a direction 19 that leads away from the housing inner space 5 so that the carbon particles are effectively carried away from the opening 9.

FIG. 3 illustrates a cross-sectional view perpendicular to the rotor shaft 2 of the electric machine 100 of a section of a further electric machine 100 that is embodied as a separately-excited synchronous machine. The electric machine in FIG. 3 differs from the electric machine illustrated in FIGS. 2, 2A by virtue of the fact in lieu of a flow-guiding element 11 a labyrinth seal 13 is provided in addition to the impeller wheel in order to prevent carbon dust from penetrating into the housing inner space 5. The impeller wheel 10 is connected upstream of the labyrinth seal 13 on the slip-ring side, in other words air that is flowing in the direction of the housing inner space 5 passes said impeller wheel 10 first.

In one embodiment, not illustrated, the impeller wheel 10 is connected downstream of the labyrinth seal 13 on the slip-ring side. It is also possible to provide several impeller wheels 10 and/or labyrinth seal 13.

The labyrinth seal 13 is embodied by means of a first form element 15 that is connected in a non-rotatable manner to the rotor shaft 2, and by means of a second form element 14 that is connected to the housing part 6 and is arranged in the opening 9.

The form elements 14, 15 comprise "sealing lips" 16 that mesh one with the other and do not contact each other and are embodied from a synthetic material or from a different electrically non-conductive material. A path is formed between these sealing lips 16 and, when viewed in the direction along the axis of rotation 24, said path comprises a form of a rectangular movement and is thus considerably longer than the depth of the opening 9. The distance covered by the carbon dust in the housing inner space 5 is thus considerably lengthened by means of the labyrinth seal 13 and the sealing effect is produced as a result.

In one embodiment, not illustrated, the labyrinth seal comprises a greater number of sealing lips that are arranged one behind the other and mesh one with the other. As a consequence, the path covered by the carbon dust is additionally lengthened and the sealing effect increased.

Although at least one exemplary embodiment has been illustrated in the aforementioned description, different changes and modifications can be performed. The mentioned embodiments are merely examples and are not provided for the purpose of limiting the scope of validity, the applicability or the configuration in any other way. On the contrary, the preceding description provides the person skilled in the art with a plan for converting at least one exemplary embodiment, wherein numerous changes in the function and the arrangement of elements described in an exemplary embodiment can be made without departing from the scope of the accompanying claims and their legal equivalents.

What is claimed is:

1. An impeller wheel for a rotating electric machine, the impeller wheel comprising:
    a hollow cylindrical base body having an outer peripheral surface, extending around an axis of rotation of the impeller wheel in a circumferential direction,
    a first end region that encircles the base body in the circumferential direction, and a second end region that encircles the base body in the circumferential direction, wherein the first end region and the second end region lie opposite one another in the direction of the axis of rotation and are circular,
    a groove extending along the peripheral surface in the circumferential direction, the groove extending between the first end region and the second end region of the base body, and
    at least one impeller element that extends across the groove between the first end region and the second end region, such that the at least one impeller element forms a trough-shaped recess in the peripheral surface of the base body of the impeller wheel and configured to generate an air movement away from the peripheral surface during rotation of the impeller wheel about the axis of rotation.

2. The impeller wheel of claim 1, wherein the at least one impeller element at least partially interrupts the groove in the circumferential direction.

3. The impeller wheel of claim 1, wherein the at least one impeller element extends fully from the first end region to the second end region, such that the at least one impeller element completely interrupts the groove in the circumferential direction.

4. The impeller wheel of claim 1, wherein the at least one impeller element extends in parallel with the axis of rotation.

5. The impeller wheel of claim 1, wherein the at least one impeller element extends in an inclined manner relative to the axis of rotation.

6. The impeller wheel of claim 1, wherein the at least one impeller element extends in a helix shape.

7. The impeller wheel of claim 1, wherein the at least one impeller element comprises a surface remote from the axis of rotation and essentially co-planar with the peripheral surface.

8. A rotating electric machine that comprises the following features:
    a rotor shaft, and
    an impeller wheel comprising:
    a hollow cylindrical base body having an outer peripheral surface, extending around an axis of rotation of the impeller wheel in a circumferential direction,
    a first end region that encircles the base body in the circumferential direction, and a second end region that encircles the base body in the circumferential direction, wherein the first end region and the second end region lie opposite one another in the direction of the axis of rotation and are circular,
    a groove extending along the peripheral surface in the circumferential direction, the groove extending between the first end region and the second end region of the base body, and
    at least one impeller element that extends across the groove from the first end region to the second end region, such that at least one impeller element forms a trough-shaped recess in the peripheral surface of the base body of the impeller wheel and is configured to generate an air movement away from the peripheral surface during rotation of the impeller wheel about the axis of rotation,
    wherein the impeller wheel is arranged on the rotor shaft and is connected to the rotor shaft in a non-rotatable manner.

9. The rotating electric machine of claim 8, further comprising:
    a housing part that at least partially encompasses a housing inner space of the electric machine, wherein the housing inner space is configured to receive the rotor shaft,
    an opening defined by the housing part, through which the rotor shaft is guided, and
    a slip ring arranged outside the housing inner space and on the rotor shaft,
    wherein the impeller wheel is arranged between the housing inner space and the slip ring and outside the housing inner space, such that the air movement generated by the impeller wheel carries away dust from at least one of the opening and the slip ring.

10. The rotating electric machine of claim 8, wherein the impeller wheel is configured to be plugged onto the rotor shaft.

11. The rotating electric machine of claim 8, comprising at least one labyrinth seal between the housing inner space and the slip ring, said labyrinth seal comprising on the rotor shaft a first form element that encircles the rotor shaft, and a second form element on the housing part that meshes with the first form element and encircles the rotor shaft.

12. The rotating electric machine of claim 11, wherein the impeller wheel and the first form element are embodied as one piece.

13. The rotating electric machine of claim 8, wherein the electric machine comprises, in the opening and between the impeller wheel and the housing inner space, a funnel-shaped flow-guiding element that encircles the rotor shaft and is configured to divert the air movement generated by the impeller wheel in a direction away from the housing inner space.

14. The rotating electric machine of claim 13, wherein the flow-guiding element is embodied as one piece with the housing part.

15. A motor vehicle, comprising:
    a rotating electric machine comprising:
    a rotor shaft, and
    an impeller wheel comprising:
    a hollow cylindrical base body having an outer peripheral surface, extending around an axis of rotation of the impeller wheel in a circumferential direction,
    a first end region that encircles the base body in the circumferential direction, and a second end region that encircles the base body in the circumferential direction, wherein the first end region and the second end region lie opposite one another in the direction of the axis of rotation and are circular,
    a groove extending along the peripheral surface in the circumferential direction, the groove extending between the first end region and the second end region of the base body, and
    at least one impeller element that extends across the groove from the first end region to the second end region, such that at least one impeller element forms a trough-shaped recess in the peripheral surface of the base body of the impeller wheel and is configured to generated an air movement away from the peripheral surface during rotation of the impeller wheel about the axis of rotation, wherein the impeller wheel is arranged on the rotor shaft and is connected to the rotor shaft in a non-rotatable manner.

16. The motor vehicle of claim 15, wherein the rotating electric machine further comprises:

a housing part that at least partially encompasses a housing inner space of the electric machine, wherein the housing inner space is configured to receive the rotor shaft, an opening defined by the housing part, through which the rotor shaft is guided, and a slip ring arranged outside the housing inner space and on the rotor shaft, wherein the impeller wheel is arranged between the housing inner space and the slip ring and outside the housing inner space, such that the air movement generated by the impeller wheel carries away dust from at least one of the opening and the slip ring.

17. The motor vehicle of claim 15, wherein the impeller wheel is configured to be plugged onto the rotor shaft.

18. The motor vehicle of claim 15, wherein the rotating electric machine comprises at least one labyrinth seal between the housing inner space and the slip ring, said labyrinth seal comprising on the rotor shaft a first form element that encircles the rotor shaft, and a second form element on the housing part that meshes with the first form element and encircles the rotor shaft.

* * * * *